(12) United States Patent
Kogure et al.

(10) Patent No.: US 10,717,399 B2
(45) Date of Patent: Jul. 21, 2020

(54) WIRE HARNESS (71) Applicant: Yazaki Corporation, Tokyo (JP)

(72) Inventors: Naoto Kogure, Shizuoka (JP); Katsumi Sato, Shizuoka (JP); Kosuke Tomosada, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/558,695

(22) Filed: Sep. 3, 2019

(65) Prior Publication Data
US 2020/0070748 A1 Mar. 5, 2020

(30) Foreign Application Priority Data

Sep. 5, 2018 (JP) ................. 2018-166051

(51) Int. Cl.
B60R 16/02 (2006.01)
H02G 3/40 (2006.01)
H02G 3/04 (2006.01)
B60J 5/06 (2006.01)
H02G 11/00 (2006.01)

(52) U.S. Cl.
CPC ............ B60R 16/0215 (2013.01); B60J 5/06 (2013.01); H02G 3/04 (2013.01); H02G 3/40 (2013.01); H02G 11/00 (2013.01)

(58) Field of Classification Search
CPC .... B60R 16/0215; B60R 16/0207; B60J 5/06; H02G 3/04; H02G 3/40; H02G 3/0437; H02G 3/0462; H02G 11/00; H02G 11/006; H02G 11/02; B60N 2/0224; B60N 2/06; H01B 7/0853; H01B 7/0846; H01B 7/041

See application file for complete search history.

(56) References Cited

U.S. PATENT DOCUMENTS 6,161,894 A * 12/2000 Chapman ................. B60J 5/06
296/155
6,323,428 B1 * 11/2001 Takano ............... B60R 16/0215
174/117 F
7,905,537 B2 * 3/2011 Sato .................... B60R 16/0215
174/101

(Continued)

FOREIGN PATENT DOCUMENTS

EP 1108621 A2 6/2001
EP 2320533 A1 5/2011

(Continued)

Primary Examiner — Roshn K Varghese
(74) Attorney, Agent, or Firm — Sughrue Mion, PLLC (57) ABSTRACT A wire harness includes: a flexible conductor; a flexible restricting member extending along the conductor and restricting a path of the conductor; a flexible armoring member through which the conductor and the restricting member are inserted; a first holding member including a first recessed part and fixed to the vehicle body, the first recessed part having a first end of the restricting member inserted therein; and a second holding member including a second recessed part and fixed to the movable body, the second recessed part having a second end of the restricting member inserted therein. Respective ends of the armoring member are fixed to the first holding member and the second holding member. The respective ends of the restricting member are held by the first recessed part and the second recessed part.

12 Claims, 10 Drawing Sheets (56) References Cited

U.S. PATENT DOCUMENTS

| | | |
|---|---|---|
| 2001/0004022 A1 | 6/2001 | Kobayashi |
| 2008/0142260 A1* | 6/2008 | Yamaguchi .......... B60N 2/0224 174/72 A |
| 2011/0147078 A1 | 6/2011 | Satou et al. |
| 2013/0214099 A1* | 8/2013 | Okumura .............. B60R 16/027 248/74.3 |
| 2015/0002286 A1 | 1/2015 | Kasai |
| 2016/0185308 A1* | 6/2016 | Sekino ................. H01B 7/1845 174/68.3 |
| 2016/0218496 A1* | 7/2016 | Terada .................. B60R 16/027 |
| 2017/0161576 A1 | 6/2017 | Banno |

FOREIGN PATENT DOCUMENTS

| | | |
|---|---|---|
| JP | 3919174 B | 2/2007 |
| JP | 2007-111247 A | 5/2007 |
| JP | 2009-113621 A | 5/2009 |
| JP | 2015-007933 A | 1/2015 |
| JP | 2016-027452 A | 2/2016 |
| JP | 2017-79555 A | 4/2017 |
| WO | 00/73095 A1 | 12/2000 |
| WO | 2002/096714 A1 | 12/2002 |

\* cited by examiner

WIRE HARNESS

CROSS-REFERENCE TO RELATED APPLICATION(S)

The present application claims priority to and incorporates by reference the entire contents of Japanese Patent Application No. 2018-166051 filed in Japan on Sep. 5, 2018.

BACKGROUND OF THE INVENTION

1. Field of the Invention

The present invention relates to a wire harness.

2. Description of the Related Art

Conventionally, there has been a wire harness including members such as one for biasing. Japanese Patent No. 3919174 discloses a power feeding device provided with a mechanism for preventing improper assembly of a harness biasing member, the mechanism including a plate spring having a recessed portion on one side thereof and another recessed portion on the other side thereof in a base end part thereof, in which: the recessed portions are disposed at different positions in a longitudinal direction of the plate spring; the base end part of the plate spring is inserted, in a direction along the plate width thereof, into a slit part formed in a block part of a protector base; the recessed portion on the one side of the plate spring engages with a raised portion inside the slit part; and a raised portion of a protector cover engages with the recessed portion on the other side of the plate spring.

A wire harness including a conductor and a restricting member that restricts a path of the conductor is desired to be capable of holding end portions of the restricting member with a simple structure.

SUMMARY OF THE INVENTION

The present invention is directed to providing a wire harness capable of holding end portions of the restricting member with a simple structure.

In order to solve the above mentioned problem and achieve the object, a wire harness according to one aspect of the present invention includes a flexible conductor connecting to each other a vehicle body part of a vehicle and a movable body installed in the vehicle and configured to slide along the vehicle body; a flexible restricting member extending along the conductor and restricting a path of the conductor; a flexible armoring member through which the conductor and the restricting member are inserted; a first holding member including a first recessed part and fixed to the vehicle body, the first recessed part having a first end of the restricting member inserted therein; and a second holding member including a second recessed part and fixed to the movable body, the second recessed part having a second end of the restricting member inserted therein, wherein respective ends of the armoring member are fixed to the first holding member and the second holding member, and the respective ends of the restricting member are held by the first recessed part and the second recessed part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes a wire harness according to an embodiment of the present invention in detail with reference to the drawings. This embodiment is not intended to limit this invention. Components that can be easily thought of by the skilled person or that are substantially identical are included among the components in the following embodiment.

Embodiment

Figure 1:
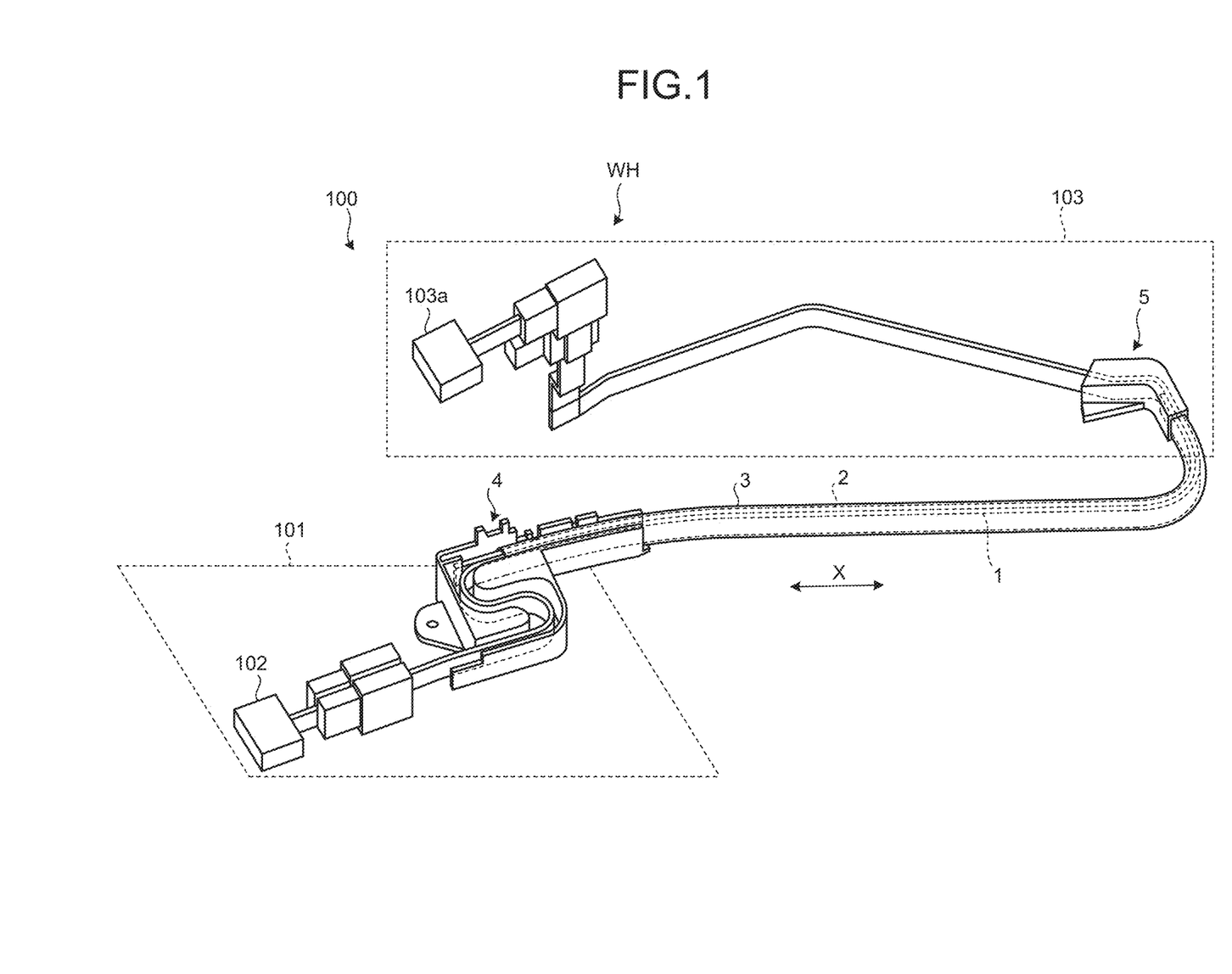
FIG. 1 is a perspective view of a wire harness according to an embodiment.
Figure 2:
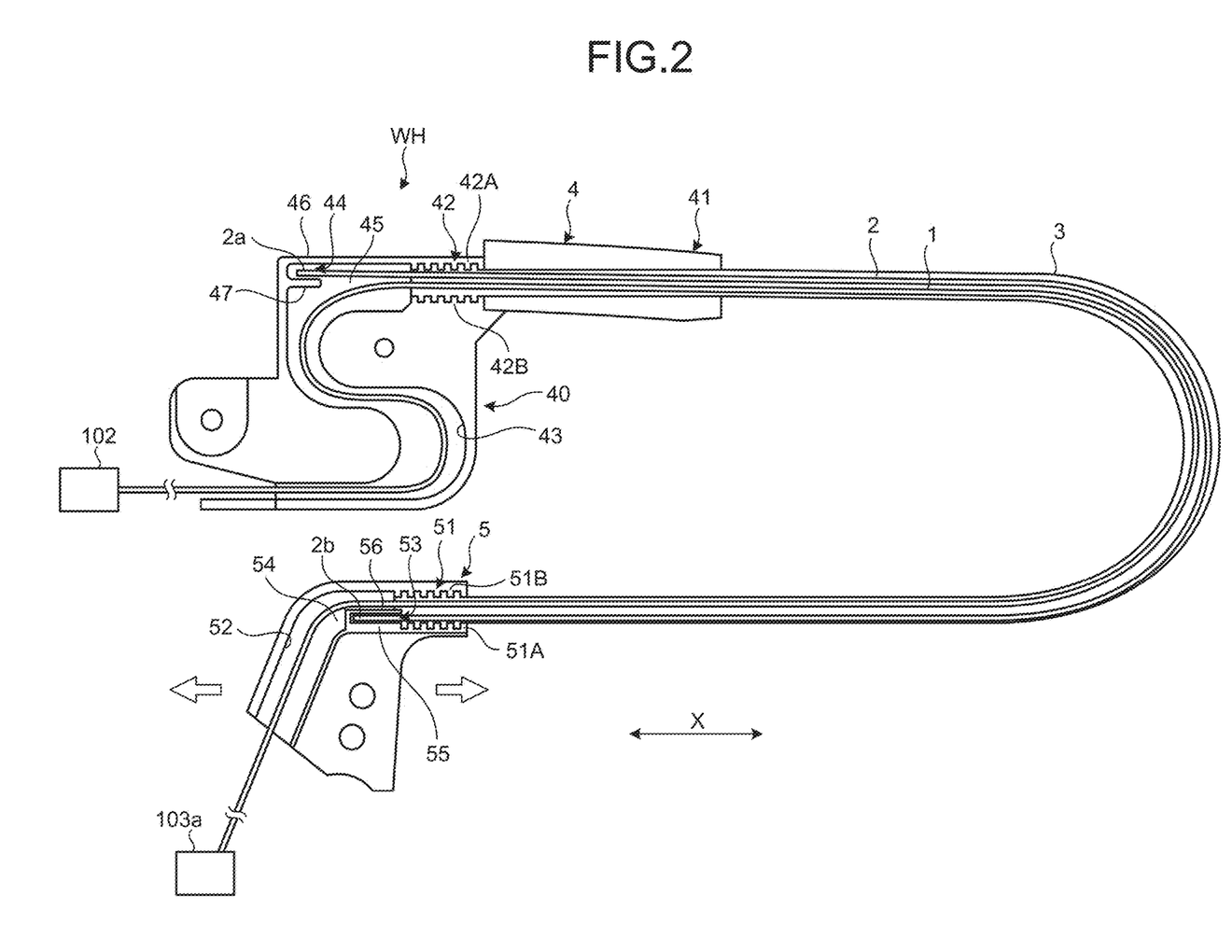
FIG. 2 is a plan view of the wire harness according to the embodiment.
Figure 3:
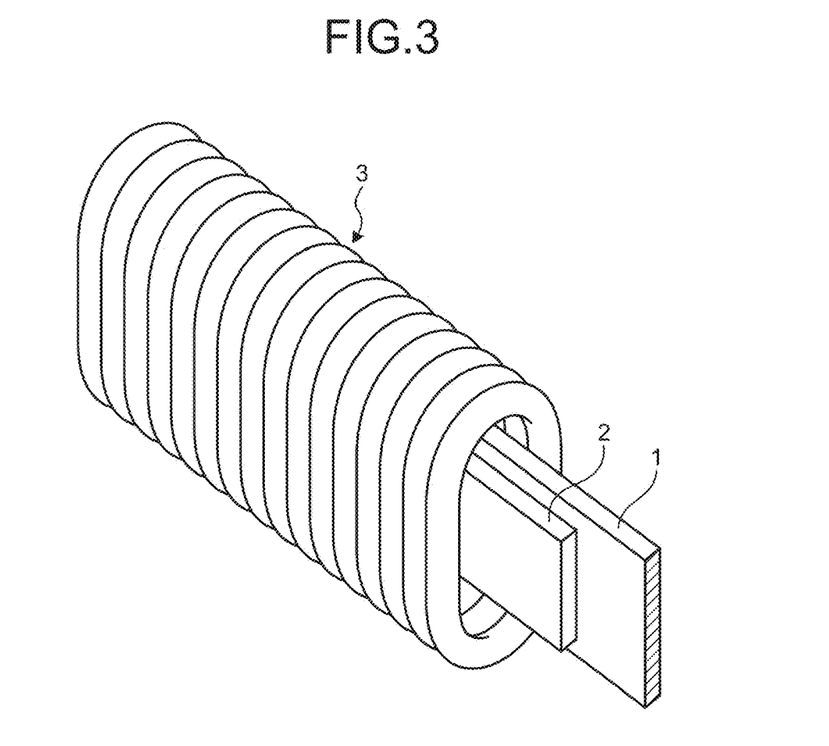
FIG. 3 is a perspective view of an armoring member, a conductor, and a restricting member according to the embodiment.
Figure 4:
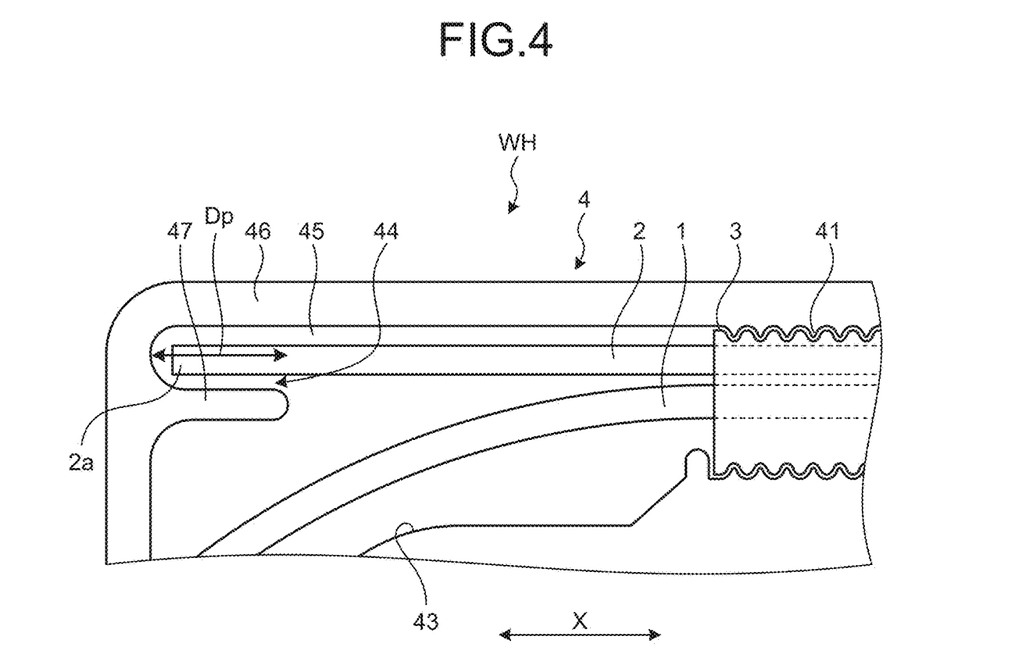
FIG. 4 is a plan view illustrating the main part of a first holding member according to the embodiment.
Figure 5:
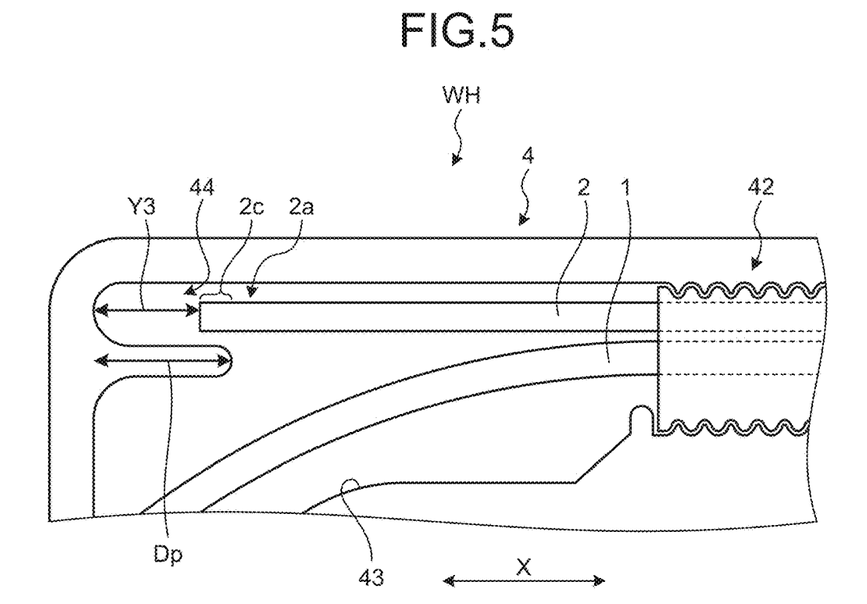
FIG. 5 is a view explaining displacement of the restricting member.
Figure 6:
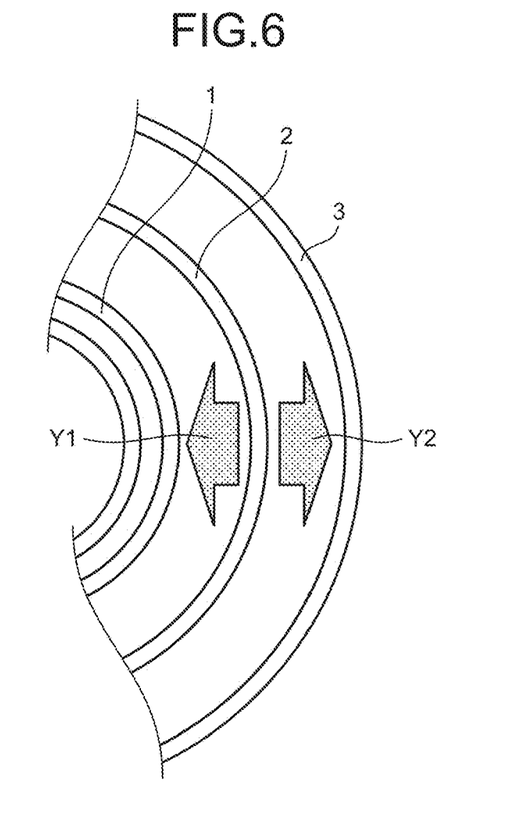
FIG. 6 is a view illustrating moves of the restricting member inside the armoring member.

An embodiment is described with reference to FIG. 1 to FIG. 6. The present embodiment relates to a wire harness. FIG. 1 is a perspective view of the wire harness according to the embodiment; FIG. 2 is a plan view of the wire harness according to the embodiment; FIG. 3 is a perspective view of an armoring member, a conductor, and a restricting member according to the embodiment; FIG. 4 is a plan view illustrating the main part of a first holding member according to the embodiment; FIG. 5 is a view illustrating displacement of the restricting member; and FIG. 6 is a view illustrating moves of the restricting member inside the armoring member.

As illustrated in FIG. 1 and FIG. 2, the wire harness WH of the present embodiment includes a conductor 1, a restricting member 2, a armoring member 3, a first holding member 4, and a second holding member 5. The conductor 1 is a flexible conductive member connecting to each other a part corresponding to a vehicle body 101 of a vehicle 100 and a sliding door 103. The shape of the conductor 1 of the present embodiment is plate-like or belt-like. The wire harness WH of the present embodiment includes a flexible flat cable (FFC) as the conductor 1. The conductor 1 includes a plurality of core cables provided in parallel and a jacket that covers the core cables all together. Each of the core cables functions as a power supply cable for power feeding, a signal cable, or the like. The power supply 102 is installed in the vehicle body 101 of the vehicle 100 and feeds power to the sliding door 103. The power supply 102 is, for example, a secondary battery such as a rechargeable car battery. A first end of the conductor 1 is connected to the power supply 102 and a control device via a connector and the like.

The sliding door 103 is a movable body that is installed in the vehicle 100 and slides along the vehicle body 101. The sliding door 103 moves relatively to the vehicle body 101 in vehicle longitudinal directions X. The sliding door 103 is, for example, a power-driven sliding door. The sliding door 103 includes a device 103a, such as a sensor, switch, or a motor, that operates with power fed by the power supply 102. A second end of the conductor 1 is connected to the device 103a via a connector and the like.

The restricting member 2 is a flexible member extending along the conductor 1 and restricting the path of the conductor 1. The restricting member 2 has, for example, bending rigidity that is higher than the bending rigidity of the conductor 1. The restricting member 2 of the present embodiment is a plate-like member formed of metal. The restricting member 2 is, for example, a flat plate-like member having a rectangular sectional shape. The restricting member 2 supports the conductor 1, for example, so that a path through which the conductor 1 extends can be prevented from deviating from a desired path.

The armoring member 3 is a flexible tubular member and is formed of, for example, an insulating synthetic resin. As illustrated in FIG. 3, the conductor 1 and the restricting member 2 are inserted through the armoring member 3. The conductor 1 and the restricting member 2 are inserted through the armoring member 3 while being overlapped on each other. Both ends of the conductor 1 project from the armoring member 3 and so do both ends of the restricting member 2. The armoring member 3 of the present embodiment is a tube formed in an accordion shape. The armoring member 3 is formed so as to be freely curved at any desired position.

The first holding member 4 is a member fixed to the vehicle body 101. The first holding member 4 is formed of, for example, an insulating synthetic resin. The first holding member 4 includes a guide part 41, an engagement part 42, a routing groove 43, and a first recessed part 44 as illustrated in FIG. 2. The engagement part 42, the routing groove 43, and the first recessed part 44 are formed in a substantially rectangular main body 40. The guide part 41 projects in a direction along one side of the main body 40. The guide part 41 is a part that guides the conductor 1, the restricting member 2, and the armoring member 3. The first holding member 4 is fixed in a manner such that the guide part 41 can extend in the vehicle longitudinal directions X.

The engagement part 42 engages with and stops an end portion of the armoring member 3. The engagement part 42 is disposed to join to the guide part 41. The engagement part 42 includes a pair of wall parts 42A and 42B that extend in the vehicle longitudinal directions X. The pair of wall parts 42A and 42B face each other. The wall parts 42A and 42B each have raised portions that correspond to the accordion shape of the armoring member 3. The raised portions of the wall parts 42A and 42B enter recessed portions of the armoring member 3, thereby engaging with and stopping the armoring member 3. The engagement part 42 restricts the armoring member 3 from moving relatively to the first holding member 4 in the vehicle longitudinal directions X.

The routing groove 43 is a path through which the conductor 1 is routed. The shape of the routing groove 43 in a plan view is substantially S-shaped. One end of the routing groove 43 joins to the engagement part 42. A portion of the conductor 1 that is projected from the armoring member 3 is routed in the routing groove 43. The routing groove 43 protects the conductor 1 and functions to accommodate an excess length of the conductor 1.

The first recessed part 44 is formed on an extension line of the guide part 41 and the engagement part 42. The first recessed part 44 has a first end 2a of the restricting member 2 inserted therein. The main body 40 of the first holding member 4 has a bottom wall 45, a lateral wall 46, and a partition wall 47. The first recessed part 44 is surrounded by the bottom wall 45, the lateral wall 46, and the partition wall 47. The bottom wall 45 is a wall part supporting a lateral side of the restricting member 2. The lateral wall 46 and the partition wall 47 project from the bottom wall 45. The lateral wall 46 is provided standing up from a marginal portion of the main body 40. The lateral wall 46 and the partition wall 47 face each other. An end portion of the partition wall 47 joins to the lateral wall 46 in the depth inside the first recessed part 44.

The partition wall 47 serves as a partition between the first recessed part 44 and the routing groove 43. That is, the first holding member 4 of the present embodiment has the first recessed part 44 and the routing groove 43 adjacent to each other with the partition wall 47 therebetween. The first recessed part 44 is open toward the engagement part 42. The first recessed part 44 is open also in a direction along the heights of the lateral wall 46 and the partition wall 47. The shape of the first recessed part 44 in a plan view is substantially rectangular. After the first end 2a of the restricting member 2 is inserted into the first recessed part 44, the engagement part 42 engages with and stops the armoring member 3, and the conductor 1 is routed through the routing groove 43, a cover is attached to the first holding member 4. The first recessed part 44, the routing groove 43, and the engagement part 42 are covered by the cover.

The second holding member 5 is a member fixed to the sliding door 103. The second holding member 5 is formed of, for example, an insulating synthetic resin. The second holding member 5 includes an engagement part 51, a routing groove 52, and a second recessed part 53 as illustrated in FIG. 2. The engagement part 51 engages with and stops an end portion of the armoring member 3. The engagement part 51 includes a pair of wall parts 51A and 51B. The second holding member 5 is fixed in a manner such that the wall parts 51A and 51B extend in the vehicle longitudinal directions X. The pair of wall parts 51A and 51B face each other. The wall parts 51A and 51B each have raised portions that correspond to the accordion shape of the armoring member 3. The raised portions of the wall parts 51A and 51B enter recessed portions of the armoring member 3, thereby engaging with and stopping the armoring member 3. The engagement part 51 restricts the armoring member 3 from moving relatively to the second holding member 5 in the vehicle longitudinal directions X.

The routing groove 52 is a path through which the conductor 1 is routed. In a plan view, the routing groove 52 is curved in a middle portion thereof. A first end of the routing groove 52 joins to the engagement part 51. In the conductor 1, a portion projecting from the armoring member 3 is routed in the routing groove 52. The routing groove 52 protects the conductor 1 and functions to accommodate an excess length of the conductor 1.

The second recessed part 53 is formed on an extension line of the engagement part 51. A second end 2b of the restricting member 2 is inserted into the second recessed part 53. The second holding member 5 has a bottom wall 54, a lateral wall 55, and a partition wall 56. The second recessed part 53 is surrounded by the bottom wall 54, the lateral wall 55, and the partition wall 56. The bottom wall 45 is a wall part supporting the lateral side of the restricting member 2. The lateral wall 55 and the partition wall 56 project from the bottom wall 54. The lateral wall 55 and the partition wall 56 face each other. The partition wall 56 joins to the lateral wall 55 in the depth of the second recessed part 53.

The partition wall 56 serves as a partition between the second recessed part 53 and the routing groove 52. That is, the second holding member 5 of the present embodiment has the second recessed part 53 and the routing groove 52 adjacent to each other with the partition wall 56 therebetween. The second recessed part 53 is open toward the engagement part 51. The second recessed part 53 is also open in height directions of the lateral wall 55 and the partition wall 56. The shape of the second recessed part 53 in a plan view is substantially rectangular. After the second end 2b of the restricting member 2 is inserted into the second recessed part 53, the engagement part 51 engages with and stops the armoring member 3, and the conductor 1 is routed through the routing groove 52, a cover is attached to the second holding member 5. The second recessed part 53, the routing groove 52, and the engagement part 51 are covered by the cover.

The first recessed part 44 of the first holding member 4 holds the first end 2a of the restricting member 2. The first recessed part 44 restricts an angle formed between the first end 2a of the restricting member 2 and the vehicle longitudinal directions X from changing. In other words, the first recessed part 44 holds the first end 2a so that a direction in which the restricting member 2 projects from the first recessed part 44 can be prevented from changing. The first recessed part 44 holds the first end 2a of the restricting member 2 so that the restricting member 2 can linearly extend along the first recessed part 44, the engagement part 42, and the guide part 41.

The second recessed part 53 of the second holding member 5 holds the second end 2b of the restricting member 2. The second recessed part 53 restricts an angle formed between the second end 2b of the restricting member 2 and the vehicle longitudinal directions X from changing. In other words, the second recessed part 53 holds the second end 2b so that a direction in which the restricting member 2 projects from the second recessed part 53 can be prevented from changing. The second recessed part 53 holds the second end 2b of the restricting member 2 so that the restricting member 2 can linearly extend along the second recessed part 53 and the engagement part 51.

The first recessed part 44 and the second recessed part 53 hold the first end 2a and the second end 2b of the restricting member 2, whereby the path of the restricting member 2 is made stable. In the wire harness WH of the present embodiment, the conductor 1, the restricting member 2, and the armoring member 3 curve between the first holding member 4 and the second holding member 5. More specifically, the conductor 1, the restricting member 2, and the armoring member 3 are folded so as to form a U-shape in a plan view. The first recessed part 42 and the second recessed part 53 hold the two ends 2a and 2b of the restricting member 2, thereby keeping the shape and the path of the restricting member 2 in predetermined shape and route. Consequently, the restricting member 2 restricts the conductor 1 so as to prevent the path of the conductor 1 from deviating from the predetermined path. In other words, the restricting member 2 restricts the path and the shape of the conductor 1 from changing into undesirable path and shape.

The first recessed part 44 and the second recessed part 53 of the present embodiment allow the ends 2a and 2b of the restricting member 2 to displace in longitudinal directions of the restricting member 2. In the present embodiment, the longitudinal directions of the restricting member 2 are the vehicle longitudinal directions X in the first recessed part 44 and the second recessed part 53. That is, the first recessed part 44 allows the first end 2a of the restricting member 2 to move relatively to the first recessed part 44 in the vehicle longitudinal directions X. The second recessed part 53 allows the second end 2b of the restricting member 2 to move relatively to the second recessed part 53 in the vehicle longitudinal directions X. As described below, the depths of the first recessed part 44 and the second recessed part 53 are determined at least to be such that the restricting member 2 does not come out.

The depth of the first recessed part 44 is described with reference to FIG. 4 to FIG. 6. The depth Dp of the first recessed part 44 is a depth thereof in the longitudinal directions of the restricting member 2. That is, the depth Dp is a length of depth in the first recessed part 44 in the vehicle longitudinal directions X. The depth Dp of the second recessed part 53 is the same as the depth Dp of the first recessed part 44. The depths Dp are determined to be such that the restricting member 2 does not come out of the first recessed part 44 and the second recessed part 53.

For example, the depths Dp are determined in consideration of a point that the restricting member 2 moves inside the armoring member 3. As illustrated in FIG. 6, the restricting member 2 may move inside the armoring member 3. In a curved portion, the restricting member 2 moves relatively to the first recessed part 44 and the second recessed part 53 as indicated by the arrow Y3 in FIG. 5 when the restricting member 2 moves radially inwardly (the arrow Y1) or when the restricting member 2 moves radially outwardly (the arrow Y2). For example, in the first holding member 4, the first end 2a of the restricting member 2 moves relatively to the first recessed part 44 in the vehicle longitudinal directions X.

The depths Dp of the present embodiment are determined to be such that, even when the restricting member 2 has moved to a position as radially outside as possible in the curved portion, the first end 2a does not come out of the first recessed part 44. A position of the first end 2a of the restricting member 2 illustrated in FIG. 5 is a position that the restricting member 2 takes when having moved to a position as radially outside as possible in the curved portion. That is, the largest possible amount by which the first end 2a of the restricting member 2 is displaced when the restricting member 2 moves inside the armoring member 3 is indicated by the arrow Y3.

As illustrated in FIG. 5, the first recessed part 44 is configured so that, even if the restricting member 2 has moved by the largest possible amount in a direction along which the restricting member 2 comes out of the first recessed part 44, a certain-length portion 2c in the first end 2a can be held by the first recessed part 44. That is, the depth Dp is larger than the largest possible amount Y3 by which the first end 2a of the restricting member 2 is displaced when the restricting member 2 moves inside the armoring member 3. The same applies to the second recessed part 53, the second end 2b of the restricting member 2 is held by the second recessed part 53 even if the restricting member 2 has moved to a position as radially outside as possible in the curved portion. Thus, the wire harness WH of the present embodiment can keep appropriately holding the restricting member 2.

The wire harness WH of the present embodiment does not need to have cutouts formed in the ends of the restricting member 2 for holding the restricting member 2. Thus, the wire harness WH of the present embodiment is capable of holding the ends of the restricting member 2 with a simple configuration. Because there is no need to have such cutouts, at least the cost for the restricting member 2 can be reduced. Having no cutouts formed in the restricting member 2 allows a plurality of such restricting members 2 to be stacked on one another. For example, a member having a curved sectional shape such as what is called a convex steel tape is considered usable as the restricting member 2. In this case, the shape of the restricting member 2 tends to be destabilized if there are cutouts formed in the restricting member 2. Consequently, it is difficult to stack the restricting members 2. In the present embodiment, the shape of the restricting member 2 is stabilized because there is no need to form cutouts in the restricting member 2. Thus, the wire harness WH of the present embodiment can include a plurality of such restricting members 2 staked on one another.

The depths Dp of the first recessed part 44 and the second recessed part 53 may be determined to be such that cutting tolerances of the restricting member 2 and the armoring member 3 are allowed. There is a possibility that, when such restricting member 2 and such armoring members 3 are obtained by cutting work, the lengths thereof may vary. The depths Dp are preferably determined to be such that tolerances in length of the restricting member 2 and length of the armoring member 3 are allowed. For example, the depths Dp may be determined to be such that the restricting member 2 does not come out of the first recessed part 44 and the second recessed part 53 when the length of the restricting member 2 is a minimum value allowed by the tolerance or when the length of the armoring member 3 is a maximum value allowed by the tolerance.

When a plurality of such restricting members 2 are stacked on one another, the depths Dp may be determined in consideration of the differences between inner and outer circumferences. When these stacked restricting members 2 have uniform lengths, the depths Dp are desirably determined to be such that the restricting member 2 that is located outermost in the radial direction in the curved portion does not come out of the first recessed part 44 and the second recessed part 53.

The first recessed part 44 and the second recessed part 53 may hold the respective ends 2a and 2b of the restricting member 2 from both sides across the restricting member 2 in a direction intersecting the longitudinal directions of the restricting member 2. For example, the first recessed part 44 and the second recessed part 53 may be configured to support the restricting member 2 from both sides across the restricting member 2 in a direction along the plate thickness thereof. In this case, in the first recessed part 44, the lateral wall 46 and the partition wall 47 have the restricting member 2 sandwiched between while individually making contact with the restricting member 2. In the second recessed part 53, the lateral wall 55 and the partition wall 56 have the restricting member 2 sandwiched between while individually making contact with the restricting member 2. This configuration facilitates restriction of the posture of the restricting member 2 in the first recessed part 44 and the second recessed part 53.

As described above, the wire harness WH of the present embodiment includes the conductor 1, the restricting member 2, the armoring member 3, the first holding member 4, and the second holding member 5. The conductor 1 has flexibility and connects the vehicle body 101 part of the vehicle 100 and the sliding door 103 that is installed in the vehicle 100 and slides along the vehicle body 101. The restricting member 2 is a flexible member extending along the conductor 1 and restricting the path of the conductor 1.

The armoring member 3 is a flexible member through which the conductor 1 and the restricting member 2 are inserted. The first holding member 4 is a member that includes the first recessed part 44 into which the first end 2a of the restricting member 2 is inserted and that is fixed to the vehicle body 101. The second holding member 5 is a member that includes the second recessed part 53 into which the second end 2b of the restricting member 2 is inserted and that is fixed to the sliding door 103.

The two respective ends of the armoring member 3 are fixed to the first holding member 4 and the second holding member 5. The two respective ends of the restricting member 2 are held by the first recessed part 44 and the second recessed part 53. The wire harness WH of the present embodiment enables the ends of the restricting member 2 with a simple configuration.

The first recessed part 44 and the second recessed part 53 of the present embodiment allow the ends 2a and 2b of the restricting member 2 to displace in longitudinal directions of the restricting member 2. The depths Dp of the first recessed part 44 and the second recessed part 53 in the longitudinal directions of the restricting member 2 are larger than the largest possible amounts by which the ends 2a and 2b of the restricting member 2 are displaced when the restricting member 2 moves inside the armoring member 3. Thus, the first recessed part 44 and the second recessed part 53 can prevent the restricting member 2 from coming out and thereby appropriately hold the restricting member 2.

The first recessed part 44 and the second recessed part 53 may hold the respective ends 2a and 2b of the restricting member 2 from both sides across the restricting member 2 in a direction intersecting the longitudinal directions of the restricting member 2. The posture of the restricting member 2 is stabilized in this manner.

First Modification of the Embodiment

Figure 7:
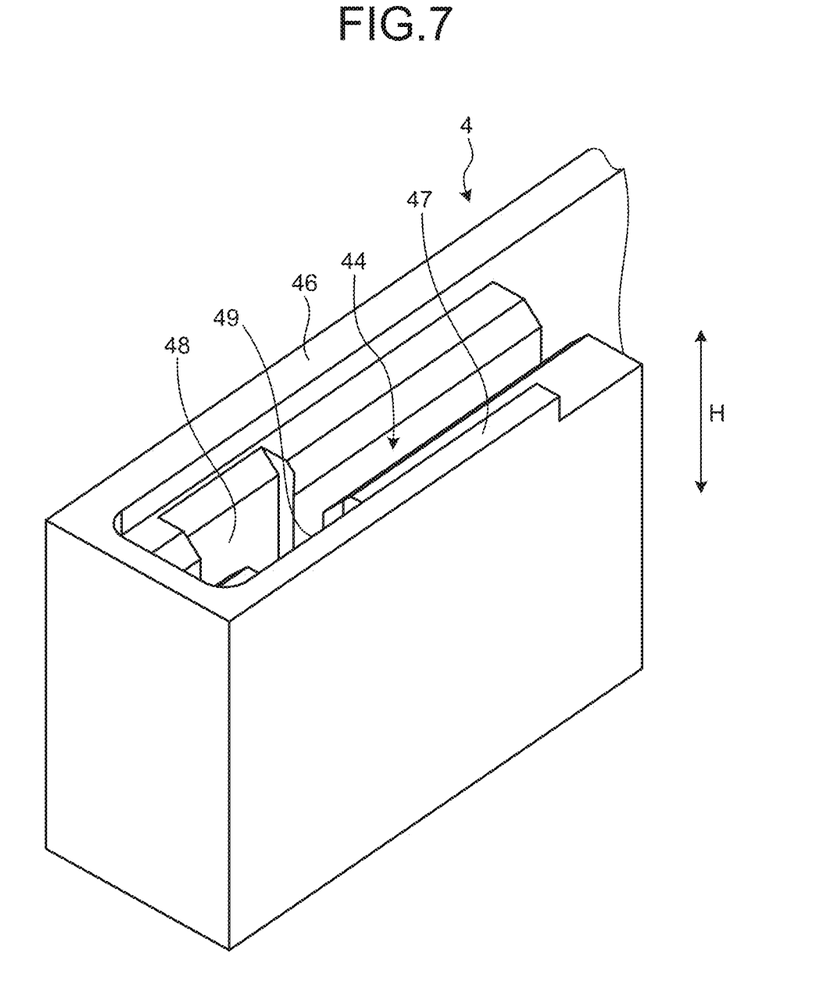
FIG. 7 is a perspective view illustrating the main part of a first holding member according to a first modification of the embodiment.
Figure 8:
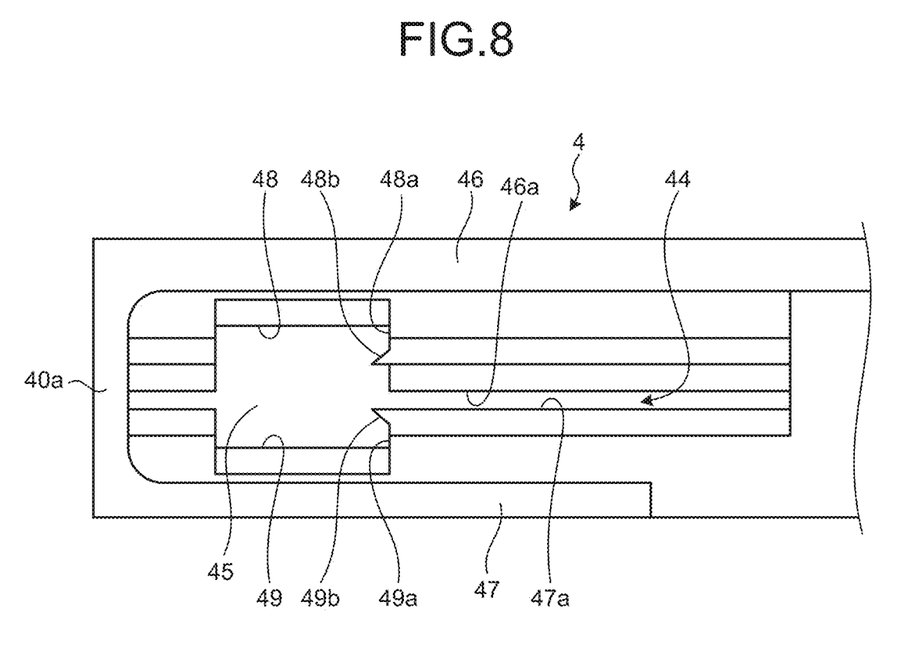
FIG. 8 is a plan view illustrating the main part of the first holding member according to the first modification of the embodiment.
Figure 9:
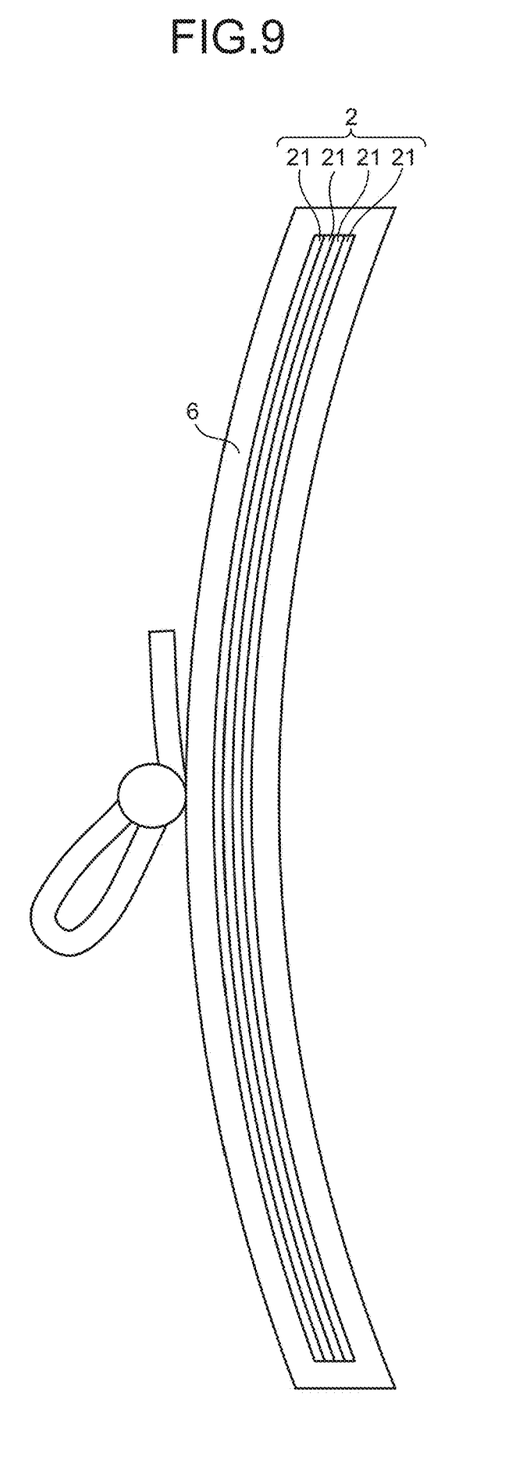
FIG. 9 is a front view of a restricting member according to the first modification of the embodiment.
Figure 10:
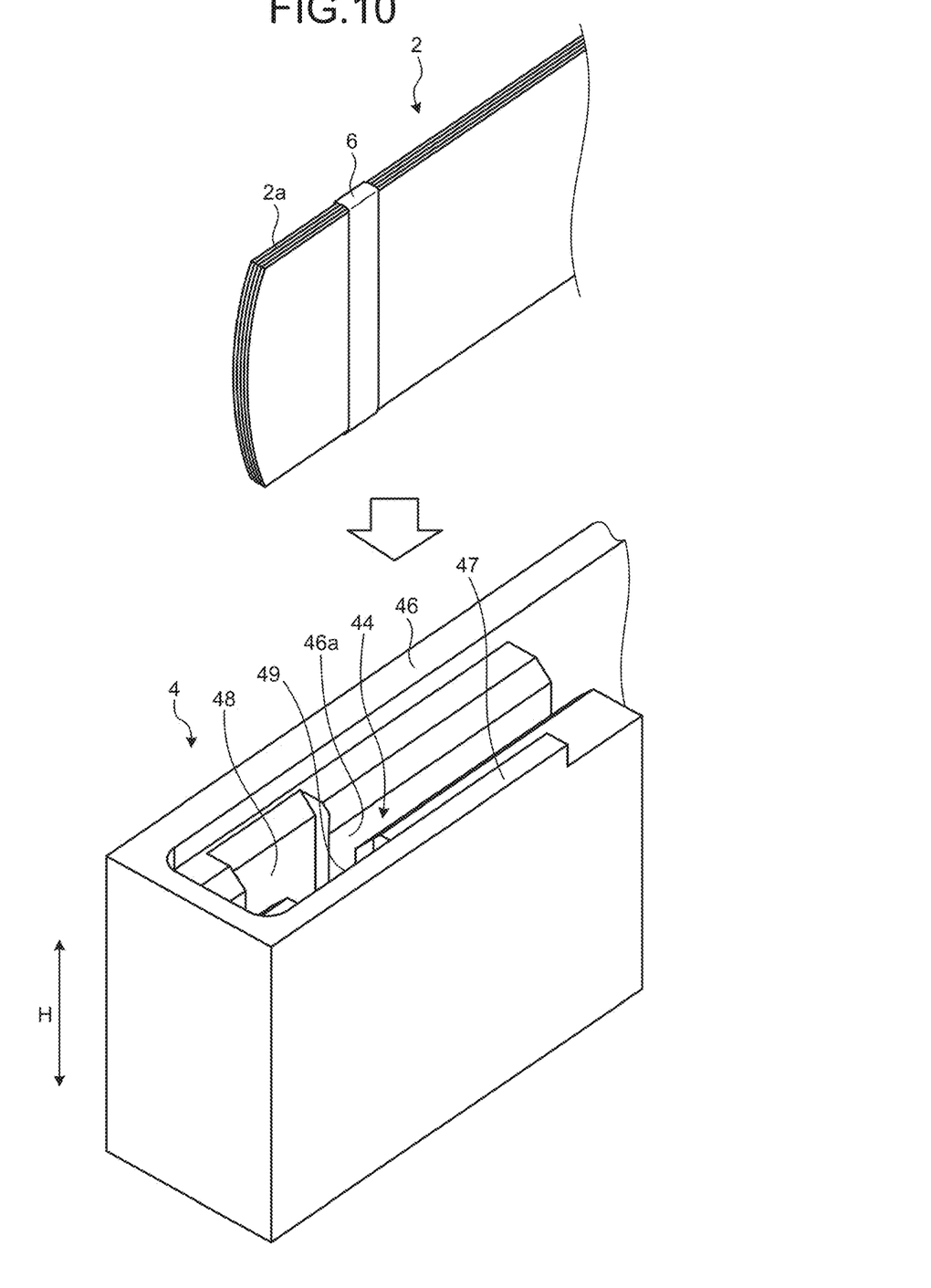
FIG. 10 is a perspective view illustrating how the restricting member is inserted into the first modification of the embodiment.
Figure 11:
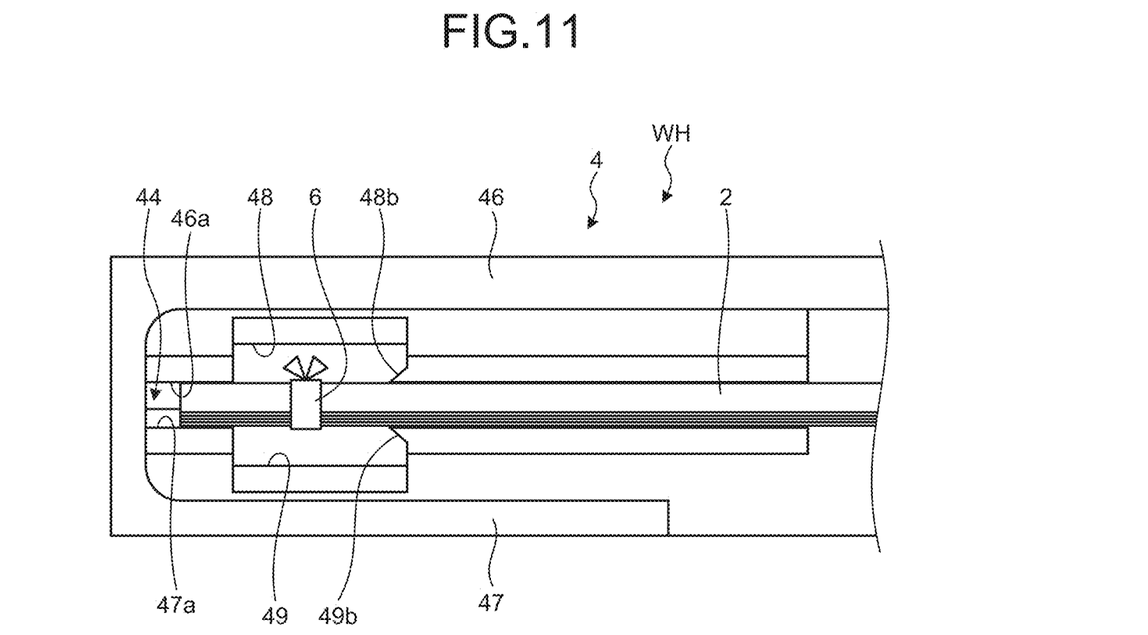
FIG. 11 is a plan view illustrating the restricting member having inserted into a first recessed part in the first modification of the embodiment.

A first modification of the embodiment is now described. FIG. 7 is a perspective view illustrating the main part of a first holding member according to the first modification of the embodiment; FIG. 8 is a plan view illustrating the main part of a first holding member according to the first modification of the embodiment; FIG. 9 is a front view of a restricting member according to the first modification of the embodiment; FIG. 10 is a perspective view illustrating how the restricting member is inserted into the first modification of the embodiment; and FIG. 11 is a plan view illustrating the restricting member inserted into a first recessed part in the first modification of the embodiment.

The first modification of the embodiment differs from the above embodiment in that the first recessed part 44 includes groove parts 48 and 49. The groove parts 48 and 49 extend in the height direction H. The height direction H is a direction in which the lateral wall 46 and the partition wall 47 project. The groove part 48 is formed in a wall surface 46a in the lateral wall 46 that faces the restricting member 2. The groove part 49 is formed in a wall surface 47a in the partition wall 47 that faces the restricting member 2. The groove part 48 and the groove part 49 face each other. The groove parts 48 and 49 extend to the bottom wall 45 in the height direction H.

Wall parts 48a and 49a that form the groove parts 48 and 49 have projections 48b and 49b formed therein. Each of the wall parts 48a and 49a is one of a pair of lateral walls that form the corresponding one of the groove parts 48 and 49. More specifically, the wall parts 48a and 49a face a wall part 40a located in the depth. In other words, the wall parts 48a and 49a face toward the front end of the restricting member 2. The projections 48b and 49b project from inner ends of the groove parts 48 and 49 toward the wall part 40a located in the depth. The projections 48b and 49b are formed in positions that allow the projections 48b and 49b to make contact with the restricting member 2 that has been inserted into the first recessed part 44. The projections 48b and 49b have tapering shapes such that the widths thereof are narrower toward the wall part 40a located in the depth. In the second recessed part 53, groove parts that are similar to the groove parts 48 and 49 and projection that are similar to the projections 48b and 49b are formed.

As illustrated in FIG. 9, the restricting member 2 in the first modification of the embodiment includes a plurality of plate-like members 21. The sectional shape of each of the plate-like members 21 is an arc-like curved shape. The plurality of the plate-like members 21 are stacked on one another and bundled together with a banding member 6 such as a string. The restricting member 2 of the first modification includes four such plate-like members 21. The restricting member 2 is delivered, for example, with the plurality of plate-like members 21 that have been cut into uniform lengths bundled together with the banding member 6. The restricting member 2 are banded together in two ends thereof with the banding members 6.

The restricting member 2 is attached to the first holding member 4 and the second holding member 5 while being kept banded together with the banding members 6. For example, as illustrated in FIG. 10, the first end 2a of the restricting member 2 is inserted into the first recessed part 44 while being kept banded by the banding members 6. In the first modification, the first end 2a of the restricting member 2 is inserted into the first recessed part 44 in the height direction H. The restricting member 2 is inserted into the first recessed part 44 in such a manner that the banding members 6 enters the groove parts 48 and 49 as illustrated in FIG. 11. The presence of the groove parts 48 and 49 allows the restricting member 2 to be easily inserted into the first recessed part 44 without having the banding members 6 removed.

After the completion of insertion of the restricting member 2 into the first recessed part 44, the banding members 6 may be removed or may be kept attached to the restricting member 2. If the banding members 6 are kept attached to the restricting member 2, the projections 48b and 49b function to prevent the banding members 6 from coming off. For example, suppose that any of the banding members 6 falls out of the restricting member 2 after the wire harness WH is attached to the vehicle 100. In this case, the projections 48b and 49b restricts movement of that banding member 6 so that the banding member 6 stays within the groove parts 48 and 49.

Second Modification of the Embodiment

Figure 12:
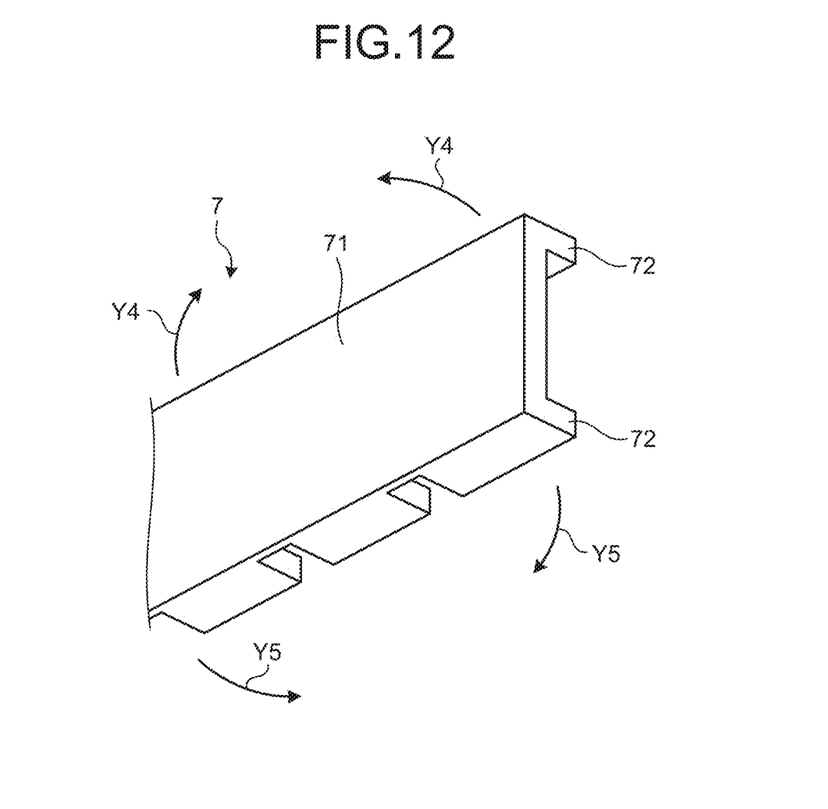
FIG. 12 is a perspective view of a restricting member according to a second modification of the embodiment.

A second modification of the embodiment is now described. FIG. 12 is a perspective view of a restricting member according to the second modification of the embodiment. A restricting member 7 of the present modification may be used in place of the restricting member 2 of the above embodiment.

The restricting member 7 of the second modification is formed of a resin material such as a synthetic resin. The restricting member 7 includes a flexible plate-like part 71 and leg parts 72. The plate-like part 71 is flexible. The leg parts 72 project from the plate-like part 71 into one side thereof in a plate thickness direction thereof. The leg parts 72 are disposed at both ends of the plate-like part 71 in a width direction thereof, and are each spaced apart from the leg parts 72 that are adjacent thereto in a longitudinal direction of the plate-like part 71. The leg parts 72 allow the plate-like part 71 to curve toward one side thereof in the plate thickness directions thereof (the arrows Y4) and restricts the plate-like part 71 toward the other side thereof in the plate thickness directions thereof (the arrows Y5). When the plate-like part 71 is forced to curve as indicated by the arrows Y5, the leg parts 72 that are adjacent to each other come in contact with each other, thereby restricting the plate-like part 71 to bent.

The material and the shape of the restricting member are not limited to the materials and the shapes of the restricting members 2 and 7. As the restricting member, any restricting member that restricts the path of the conductor 1, and such restricting member having any one of various shapes such as plate-like, rod-like, and tubular shapes is usable. The first recessed part 44 and the second recessed part 53 have shapes designed as appropriate according to the shape of the restricting member to be used and the number of such restricting members.

Third Modification of the Embodiment

Figure 13:
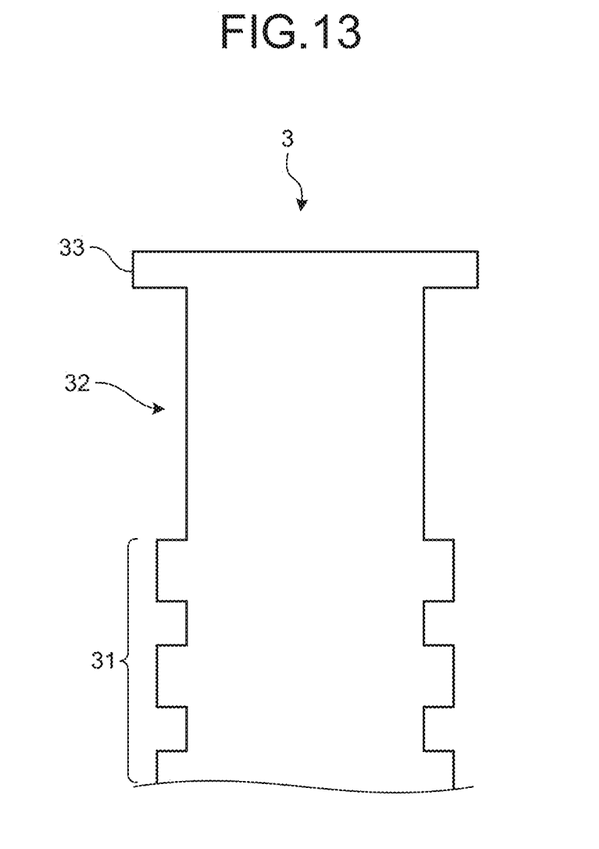
FIG. 13 is a plan view illustrating an armoring member according to a third modification of the embodiment.

A third modification of the embodiment is now described. FIG. 13 is a plan view illustrating an armoring member according to a third modification of the embodiment. The armoring member 3 according to the third modification of the embodiment includes an accordion part 31, a tubular part 32, and a flange part 33. The accordion part 31, the tubular part 32, and the flange part 33 are integrally formed of a material such as an insulating synthetic resin.

The accordion part 31 is a part formed in an accordion shape and is flexible. The tubular part 32 joins to an end portion of the accordion part 31. The tubular part 32 is formed in a round tubular shape. The higher bending rigidity of the tubular part 32 is higher than the bending rigidity of the accordion part 31. The flange part 33 projects radially outward from an end portion of the tubular part 32. In the armoring member 3 of the third modification, the first holding member 4 and the second holding member 5 engage with and stop the corresponding flange parts 33.

Restriction of the path of the conductor 1 is facilitated by the combined use of the flexible accordion part 31 and the tubular part 32 that has high bending rigidity. The tubular part 32 has, for example, the function of restricting the conductor 1 from bending and the function of restricting a direction in which the conductor 1 extends from coming out of a predetermined direction. The armoring member 3 restricts the path of the conductor 1, whereby effects such as weight reduction of the restricting member 2 can be brought about.

The conductor 1 is not limited to an FFC that is given as an example. As the conductor 1, another electric cable such as a round cable or a flat cable may be used.

The movable body that slides along the vehicle body 101 is not limited to the sliding door 103. The movable body may be, for example, a slidable seat. That is, the wire harness WH may be used for connecting a sliding seat and the vehicle body 101 part.

Contents disclosed above in the embodiment and the modifications can be implemented as appropriate.

A wire harness according to the present embodiment includes: a flexible conductor connecting to each other a vehicle body part of a vehicle and a movable body installed in the vehicle and configured to slide along the vehicle body; a flexible restricting member extending along the conductor and restricting a path of the conductor; a flexible armoring member through which the conductor and the restricting member are inserted; a first holding member including a first recessed part and fixed to the vehicle body, the first recessed part having a first end of the restricting member inserted therein; and a second holding member including a second recessed part and fixed to the movable body, the second recessed part having a second end of the restricting member inserted therein.

Respective ends of the armoring member are fixed to the first holding member and the second holding member. The respective ends of the restricting member are held by the first recessed part and the second recessed part. The wire harness according to the present embodiment enables the restricting member to be held by the first recessed part and the second recessed part even without cutouts or the like formed in the ends of the restricting member. Thus, the wire harness according to the present embodiment is effective in making itself capable of holding the ends of the restricting member with a simple configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
   a flexible conductor connecting to each other a vehicle body part of a vehicle and a movable body installed in the vehicle and configured to slide along the vehicle body;
   a flexible restricting member extending along the conductor and restricting a path of the conductor;
   a flexible armoring member through which the conductor and the restricting member are inserted;
   a first holding member including a first recessed part and fixed to the vehicle body, the first recessed part having a first end of the restricting member inserted therein; and
   a second holding member including a second recessed part and fixed to the movable body, the second recessed part having a second end of the restricting member inserted therein, wherein
   respective ends of the armoring member are fixed to the first holding member and the second holding member, and
   the respective ends of the restricting member are held by the first recessed part and the second recessed part such that the flexible conductor is not inserted into the first and second recessed parts and the flexible restricting member extends from the first holding member to the second holding member.

2. The wire harness according to claim 1, wherein
   the first recessed part and the second recessed part allow the ends of the restricting member to displace along longitudinal directions of the restricting member, and depths of the first recessed part and the second recessed part in the longitudinal directions of the restricting member are larger than largest possible amounts by which the ends of the restricting member are displaced when the restricting member moves inside the armoring member.

3. The wire harness according to claim 2, wherein
   the first recessed part and the second recessed part hold the respective ends of the restricting member from both sides across the restricting member in a direction intersecting a longitudinal direction of the restricting member.

4. The wire harness according to claim 2, wherein
   the restricting member is held by the first recessed part and the second recessed part with a portion of the restricting member between the first recessed part and second recessed part being curved.

5. The wire harness according to claim 2, wherein
   in the first recessed part and the second recessed part, a wall that faces the restricting member has a groove part extending in a direction perpendicular to a longitudinal direction of the restricting member.

6. The wire harness according to claim 1, wherein
   the first recessed part and the second recessed part hold the respective ends of the restricting member from both sides across the restricting member in a direction intersecting a longitudinal direction of the restricting member.

7. The wire harness according to claim 6, wherein
   the restricting member is held by the first recessed part and the second recessed part with a portion of the restricting member between the first recessed part and second recessed part being curved.

8. The wire harness according to claim 6, wherein
   in the first recessed part and the second recessed part, a wall that faces the restricting member has a groove part extending in a direction perpendicular to a longitudinal direction of the restricting member.

9. The wire harness according to claim 1, wherein
   the restricting member is held by the first recessed part and the second recessed part with a portion of the restricting member between the first recessed part and second recessed part being curved.

10. The wire harness according to claim 9, wherein
    in the first recessed part and the second recessed part, a wall that faces the restricting member has a groove part extending in a direction perpendicular to a longitudinal direction of the restricting member.

11. The wire harness according to claim 1, wherein
    in the first recessed part and the second recessed part, a wall that faces the restricting member has a groove part extending in a direction perpendicular to a longitudinal direction of the restricting member.

12. The wire harness according to claim 1, wherein
    the respective ends of the armoring member are longitudinal ends of the armoring member and are further fixed within respective ones of the first holding member and the second holding member.

* * * * *